(12) United States Patent
Han et al.

(10) Patent No.: US 7,829,216 B2
(45) Date of Patent: Nov. 9, 2010

(54) SECONDARY BATTERY HAVING INDEPENDENT COUPLING FRAME MEMBERS AND BATTERY MODULE HAVING THE SAME

(75) Inventors: Ji Hoon Han, Daejeon (KR); Junill Yoon, Seoul (KR); Hyosang Woo, Daejeon (KR)

(73) Assignee: LG Chem, Ltd. (KR)

( * ) Notice: Subject to any disclaimer, the term of this patent is extended or adjusted under 35 U.S.C. 154(b) by 1104 days.

(21) Appl. No.: 11/514,702

(22) Filed: Sep. 1, 2006

(65) Prior Publication Data
US 2007/0207377 A1    Sep. 6, 2007

(30) Foreign Application Priority Data
Sep. 2, 2005    (KR)    ............. 10-2005-0081479

(51) Int. Cl.
*H01M 6/12*    (2006.01)
(52) U.S. Cl. .............. 429/162; 429/130; 429/185; 429/163; 429/176
(58) Field of Classification Search ............. 429/162, 429/130, 160, 163, 164, 174, 185, 176, 153, 429/149, 175, 177, 211
See application file for complete search history.

(56) References Cited

U.S. PATENT DOCUMENTS

| | | | |
|---|---|---|---|
| 7,597,992 B2 * | 10/2009 | Kanai et al. | 429/53 |
| 2007/0024236 A1 * | 2/2007 | Arakelian | 320/107 |

FOREIGN PATENT DOCUMENTS

| | | | |
|---|---|---|---|
| JP | 63-205047 | * | 8/1988 |
| WO | 2005/074054 | | 8/2005 |
| WO | WO2005/074054 | | 8/2005 |
| WO | WO 2005/096412 | * | 10/2005 |

* cited by examiner

*Primary Examiner*—Raymond Alejandro
(74) *Attorney, Agent, or Firm*—Cantor Colburn LLP

(57) ABSTRACT

The present invention is a secondary battery, which is formed in the shape of a plate and has an electrode assembly mounted in a battery case made of a laminated sheet including a metal layer and a resin layer, wherein the secondary battery is constructed in a structure in which independent coupling type frame members are mounted to the outside part of a sheathing member serving as the battery case, and a medium- or large-sized battery module including the same as a unit cell.

17 Claims, 7 Drawing Sheets

Prior Art

SECONDARY BATTERY HAVING INDEPENDENT COUPLING FRAME MEMBERS AND BATTERY MODULE HAVING THE SAME

FIELD OF THE INVENTION

The present invention relates to a secondary battery and a battery module having the same, and, more particularly, to a secondary battery, which is formed in the shape of a plate and has an electrode assembly mounted in a battery case made of a laminated sheet including a metal layer and a resin layer, wherein the secondary battery is constructed in a novel structure in which independent coupling type frame members are mounted to the outside part of a sheathing member serving as the battery case, whereby the mechanical strength and the sealability of the secondary battery are improved, and a medium- or large-sized battery module constructed using the same.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several battery cells for each device. On the other hand, medium- or large-sized devices, such as vehicles, use a medium- or large-sized battery pack having a plurality of battery cells electrically connected with each other because high output and large capacity is necessary for the medium- or large-sized devices.

Preferably, the medium- or large-sized battery pack is manufactured with small size and small weight if possible. For this reason, a rectangular battery or a pouch-shaped battery, which has a small weight to capacity ratio, is usually used as a battery cell of the medium- or large-sized battery pack. Especially, much interest is currently generated in the pouch-shaped battery, which uses a laminate sheet comprising a metal layer and a resin layer as a sheathing member.

FIG. 1 is a perspective view typically illustrating a conventional representative pouch-shaped battery 10. The pouch-shaped battery shown in FIG. 1 is constructed in a structure in which two electrode leads 11 and 12 protrude from the upper end and the lower end of a battery cell 13, respectively, while the electrode leads 11 and 12 are opposite to each other. A sheathing member 14 comprises upper and lower sheathing parts. An electrode assembly (not shown) is received in a receiving part 15, which is defined between the upper and lower sheathing parts of the sheathing member 14. Opposite sides 14b and upper and lower ends 14a and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14b and upper and lower ends 14a and 14c of the upper and lower sheathing parts of the sheathing member 14, which are in contact with each other, to each other by applying heat and pressure to the opposite sides 14b and upper and lower ends 14a and 14c of the upper and lower sheathing parts of the sheathing member 14 so as to weld the resin layers to each other. According to circumstances, the opposite sides 14b and upper and lower ends 14a and 14c of the upper and lower sheathing parts of the sheathing member 14 may be bonded to each other using a bonding agent. For the opposite sides 14b of the sheathing member 14, the same resin layers of the upper and lower sheathing parts of the sheathing member 14 are in direct contact with each other, whereby uniform sealing at the opposite sides 14b of the sheathing member 14 is accomplished by welding. For the upper and lower ends 14a and 14b of the sheathing member 14, on the other hand, the electrode leads 11 and 12 protrude from the upper and lower ends 14a and 14b of the sheathing member 14. For this reason, the upper and lower ends 14a and 14b of the upper and lower sheathing parts of the sheathing member 14 are thermally welded to each other, while a film-shaped sealing member 16 is interposed between the electrode leads 11 and 12, in consideration of the thickness of the electrode leads 11 and 12 and the difference in material between the electrode leads 11 and 12 and the sheathing member 14, so as to increase sealability.

In the pouch-shaped battery 10, however, the battery cell 13 repeatedly expands and contracts during the charge and the discharge of the pouch-shaped battery 10. As a result, the thermally welded regions of the upper and lower ends 14 and 14c, especially the opposite sides 14b, of the upper and lower sheathing parts of the sheathing member 14, are easily separated from each other. Furthermore, the mechanical strength of the sheathing member 14 is low. In order to solve this problem, there have been proposed a method of applying an epoxy resin or a silicon resin to the outside sealing regions of the sheathing member 14, or attaching a sealing film to the outside sealing regions of the sheathing member 14, so as to improve the sealability, and a method of mounting batteries in additional members having sufficient mechanical strength, such as cartridges, respectively, and stacking the additional members one on another.

However, the method of using the additional sealing member is very complicated, and a battery manufactured by this method has a structure unsuitable to construct a medium- or large-sized battery pack. When the cartridges are used, on the other hand, the total weight and the total size of the battery pack are increased, and the assembly process is very complicated.

In a conventional medium- or large-sized battery module constructed by stacking a plurality of such pouch-shaped batteries one on another, the electrode leads of the unit cells are bent for electrical connection, and the bent electrode leads are connected to each other by welding, soldering, or mechanical coupling. However, internal resistance is increased due to the bending of the electrode leads. According to circumstances, portions of the bent regions may be broken, and the broken portions of the bent regions serve as heating spots, which may cause fire or explosion.

SUMMARY OF THE INVENTION

Therefore, the present invention has been made to solve the above-mentioned problems, and other technical problems that have yet to be resolved.

Specifically, it is an object of the present invention to provide a secondary battery having a novel structure for improving the mechanical strength of a sheathing member of a plate-shaped battery, such as a pouch-shaped battery, and further improving the sealing force at a sealing region of the battery.

It is another object of the present invention to provide a secondary battery having a novel structure for easily accomplishing stacking and electrical connection without using a large-sized mounting member, such as a cartridge, thereby constructing a medium- or large-sized battery module.

It is yet another object of the present invention to provide a medium- or large-sized battery pack including the above-mentioned secondary battery as a unit cell, whereby the structural stability of the battery pack is increased, the battery pack is constructed with a compact structure and light weight, and the assembly process of the battery pack is further simplified.

In accordance with one aspect of the present invention, the above and other objects can be accomplished by the provision of a secondary battery, which is formed in the shape of a plate and has an electrode assembly mounted in a battery case made of a laminated sheet including a metal layer and a resin layer, wherein the secondary battery is constructed in a structure in which independent coupling type frame members are mounted to the outside part of a sheathing member serving as the battery case.

The secondary battery according to the present invention is a thin-type secondary battery having a small thickness, and the sheathing member serving as the battery case is constructed in the laminate structure including the metal layer and the resin layer. A typical example of such a secondary battery is a pouch-shaped battery using a laminate sheet made of aluminum and resin as a sheathing member. The sheathing member of the pouch-shaped battery may be constructed in various structures. For example, the sheathing member of the pouch-shaped battery may be constructed in a structure in which an electrode assembly is received in a receiving part formed at the upper inner surface and/or the lower inner surface of a one-unit folding type member, and the upper and lower contact regions are sealed or in a structure in which an electrode assembly is received in a receiving part formed at the upper inner surface and/or the lower inner surface of a two-unit member, and the upper and lower contact regions are sealed. A pouch-shaped battery with the above-stated structure is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises a cathode and an anode, by which the charge and the discharge of the battery are possible. The electrode assembly is constructed in a structure in which the cathode and the anode are stacked while a separator is disposed between the cathode and the anode. For example, the electrode assembly is constructed in a jelly-roll type structure or in a stack type structure. The cathode and the anode of the electrode assembly may be constructed such that an electrode tap of the cathode and an electrode tap of the anode directly protrude outward from the battery. Alternatively, the cathode and the anode of the electrode assembly may be constructed such that the electrode tap of the cathode and the electrode tap of the anode are connected to additional electrode leads, and the electrode leads protrude outward from the battery. The protruding direction of the electrode taps or the electrode leads is not particularly restricted. For example, the electrode taps or the electrode leads may protrude together from the upper end of the battery, the electrode taps or the electrode leads may protrude from the upper and lower ends of the battery, respectively, while the electrode taps or the electrode leads are opposite to each other, or the electrode taps or the electrode leads may protrude from the upper end and the side of the battery, respectively, such that the electrode taps or the electrode leads are perpendicular to each other.

One of the characteristics of the present invention is that, as described above, the secondary battery is constructed in a structure in which the independent coupling type frame members are mounted to the outside part of the sheathing member serving as the battery case.

In the present invention, the term "independent coupling type structure" means that the frame members, which are mounted to the outside part of the battery case, i.e., the opposite sides, the upper end, and the lower end of the battery case, are separate members, and these frame members are attached to the corresponding regions of the battery case in a coupling fashion. In the independent coupling type structure, the frame members may be coupled to the neighboring frame members without the frame members being directly coupled to the outside part of the battery case. Consequently, the independent coupling type structure according to the present invention is distinguished from a conventional integration structure, such as a lattice-type cartridge. Furthermore, the independent coupling type structure according to the present invention is distinguished from a film-shaped member, which is applied or attached to the sealing region of the battery case.

For a plate-shaped battery, the battery case of which is made of a laminate sheet, the battery case is provided at the upper end thereof, and, according to circumstances, at the opposite sides thereof with thin plate-shaped sealing parts. Especially, the sealability of the side sealing parts may be lowered due to repetitive expansion and contraction of the battery cell during the charge and the discharge of the battery. Consequently, it is preferable that the coupling between the frame member which is coupled to the upper end of the battery case ("upper frame member") and the frame members which are coupled to the sides of the battery case ("side frame members") be accomplished by inserting the thin plate-shaped sealing parts into coupling grooves formed at predetermined positions of the frame members.

In the present invention, the term "frame members" means members having a thickness at least sufficient to be attached to the outside part of the battery case in a coupling fashion. Consequently, the frame members are distinguished from members having a film-like thickness.

The frame members may be different from each other depending upon the shape of the outside part of the battery case, to which the frame members are coupled. In a preferred embodiment, the upper and lower frame members may have the same height, and the height of the upper and lower frame members may be greater than the height of the side frame members. This structure provides high stability when a plurality of secondary batteries according to the present invention are stacked one on another so as to construct a medium- or large-sized battery module. Especially, the height of the side frame members is relatively small, and therefore, a space defined between the side frame members may be used as a coolant flow channel.

In this structure, the side frame members are tapered (inclined), preferably, outward at the upper surfaces and/or the lower surfaces thereof. Consequently, the introduction of the coolant is easily accomplished, and the introduced coolant flows along the outer surface of the battery in a streamlined fashion, whereby the cooling efficiency is improved.

The material for the frame members is not particularly restricted. For example, the frame members may be made of plastic, metal, or wood. Preferably, the frame members are made of the plastic, which is inexpensive and provides good insulation. The frame members coupled to the sealing part of the battery case may be made of an elastic material, preferably, at least at sealing part contact portions of the frame members. The elastic material increases the coupling force between the frame members and the sealing part of the battery case, when the frame members are coupled to the battery case, thereby increasing the sealing efficiency. As an example, each of the side frame members comprises: a core part having high mechanical strength; and an elastic part surrounding the outer surface of the side frame member, whereby the sealing force of the opposite side sealing regions of the battery case is increased. Typical examples of the elastic material may be natural rubber and synthetic rubber; however, the present invention is not limited to the above-specified material. According to circumstances, an auxiliary sealing agent, such as silicon, may be applied to predetermined positions of the frame members, at which the frame members are in contact with the battery case, whereby the sealing force of the sealing part of the battery case is increased when the frame members are coupled to the battery case. In this case, the frame members may be provided with depressions, in which the auxiliary sealing agent can be filled.

In the case that the coupling between the frame members and the outside part of the battery case is accomplished by inserting the outside part of the battery case into the coupling grooves formed at the frame members, as described above, the size (the width) of the coupling grooves depends on the shape of the outside part of the battery case, with which the frame members are brought into contact when the frame members are coupled to the battery case. Consequently, in the case that the opposite side frame members are simultaneously coupled to the thin plate-shaped sealing parts of the battery case and a part of the battery cell, which is relatively thick, the coupling grooves may be constructed in a multi-step depression structure corresponding to the shape of the above-mentioned parts.

In a preferred embodiment, the upper frame member and/or the lower frame member may be provided at corresponding regions of the upper frame member and/or the lower frame member, which are brought into contact with the side frame members, with coupling grooves, which correspond to the vertical sectional shape of the side frame members, whereby the upper frame member and/or the lower frame member are coupled to the side frame members.

Also, the upper frame member and/or the lower frame member may be further provided at the upper and lower surfaces thereof with coupling protrusions and grooves corresponding to the coupling protrusions such that, when a plurality of batteries are stacked one on another, the coupling protrusions are engaged in the corresponding grooves, whereby the stacking operation of the batteries is stably and correctly carried out.

Another characteristic of the present invention is that, in a preferred embodiment, the plate-shaped electrode leads of the battery can be electrically connected to bus bars without the electrode leads being bent.

To this end, the upper frame member, which is coupled to the upper end of the battery case where the plate-shaped electrode leads of the battery are located, is provided along the side thereof with horizontal grooves, into which the plate-shaped electrode leads are inserted, the upper frame member is provided at the middle part thereof with vertical grooves, to which the electrode leads are connected, and the bus bars are connected to the electrode leads introduced through the horizontal grooves while the bus bars are mounted to the upper frame member through the vertical grooves. The bus bars may be bent in the shape of a '⌐' such that the vertical parts of the bus bars are inserted into the vertical grooves, and the horizontal parts of the bus bars may be brought into contact with the electrode leads. Alternatively, the bus bars may be bent in the shape of a '⌐' after the bus bars are inserted into the vertical grooves, and then the horizontal parts of the bus bars may be brought into contact with the electrode leads.

A welding process may be carried out so as to more stably maintain the connection between the electrode leads and the bus bars. Preferably, the upper frame member is provided with openings, through which the connected parts of the electrode leads and the bus bars are exposed, whereby the welding process is easily carried out.

In order to easily accomplish the electrical connection when a plurality of batteries are stacked one on another to construct a series-connection type battery module, the bus bars, which are connected to the corresponding electrode leads, may be securely inserted into the vertical grooves of the upper frame member, preferably, in opposite directions, whereby the bus bar (a) connected to the electrode lead (A) is exposed from the upper surface of the upper frame member, and the bus bar (b) connected to the electrode lead (B) is exposed from the lower surface of the upper frame member.

In a preferred embodiment, each bus bar is provided at one side thereof with a voltage-detection and connection protrusion, and the upper frame member is provided at the side thereof with a side groove such that the voltage-detection and connection protrusion is exposed through the side groove while each bus bar is mounted to the upper frame member, whereby the electrical connection between the batteries is achieved by the bus bars and, at the same time, the connection for voltage detection is accomplished. In this case, the end of the electrode lead, which is exposed from the side groove, is cut off, whereby the voltage-detection and connection protrusion is easily connected to a predetermined circuit through the side groove.

Also, each bus bar is provided at one side thereof with a side extension, by which the welding, preferably, the resistance welding of the bus bars, which are in contact with each other, is easily performed when the stacked batteries are electrically connected with each other, and the upper frame member is provided at the outer surface thereof corresponding to the side extension with another side groove, to which a welding tip makes an approach.

In accordance with one aspect of the present invention, there is provided a medium- or large-sized battery module constructed by stacking the above-described secondary batteries as unit cells.

The battery module according to the present invention is constructed in a structure in which two or more secondary batteries (unit cells) are stacked one on another, and are then electrically connected with each other, such that the battery module has high output and large capacity. The stacking of the unit cells is accomplished by contacting the unit cells while in a face-to-face fashion without using additional members, such as cartridges. Consequently, it is possible to manufacture a battery module having a compact and light-weight structure.

Preferably, the battery module is used as a power source for various devices, such as electric vehicles, hybrid electric vehicles, electric motor cycles, and electric bicycles, which requires high-output, large-capacity power, is to be stable with respect to frequent external forces, such as vibrations and impacts, and is to have small size and light weight as compared to the output and the capacity of the battery module.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
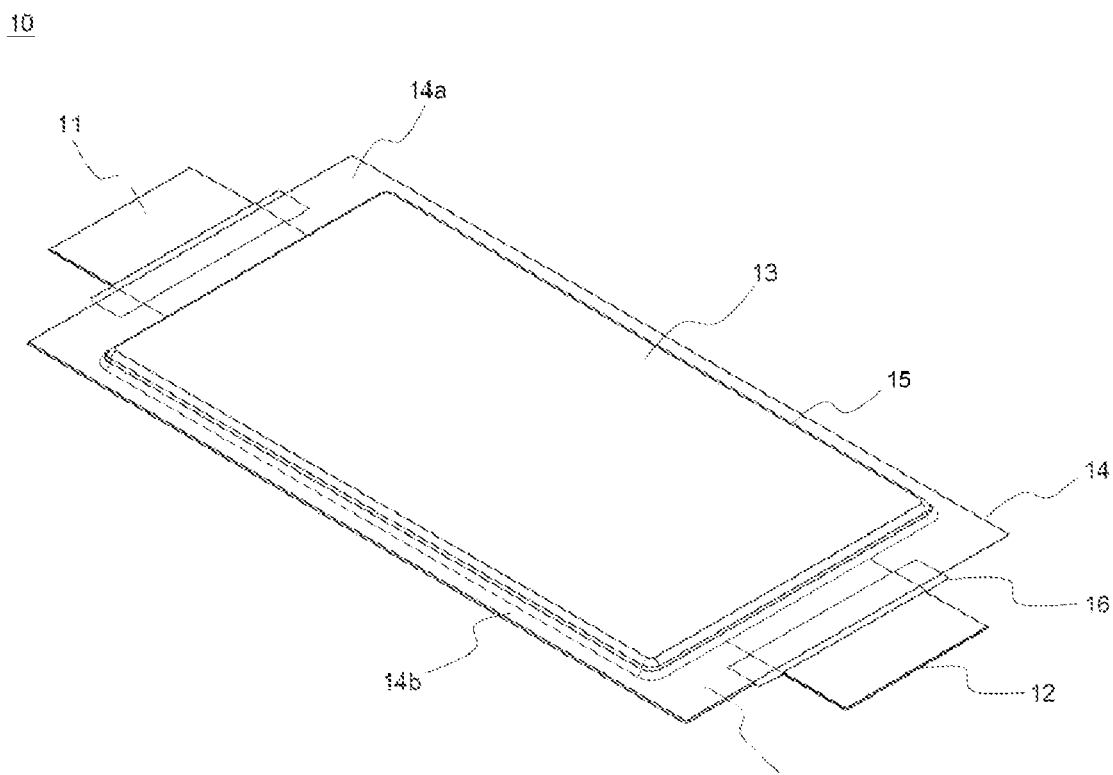
FIG. 1 is a perspective view illustrating a conventional representative pouch-shaped battery.
Figure 2:
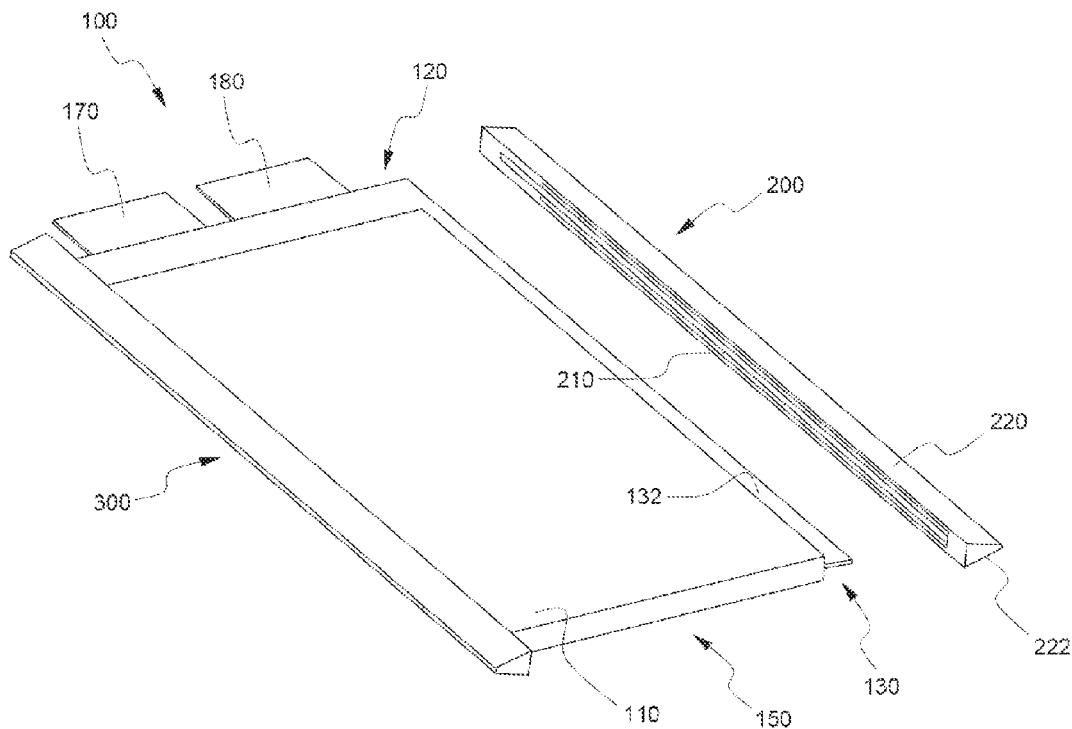
FIGS. 2 to 4 are a perspective view, a partially enlarged view, and a vertical sectional view illustrating a side frame member, which is coupled to each side of a battery case of a secondary battery according to a preferred embodiment of the present invention, respectively.
Figure 3:
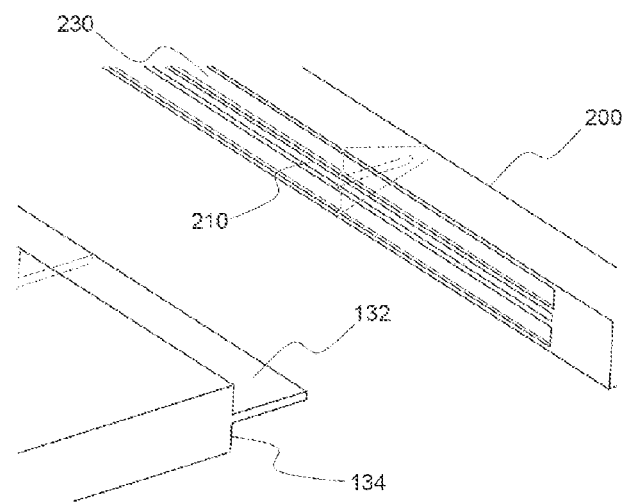
Figure 4:
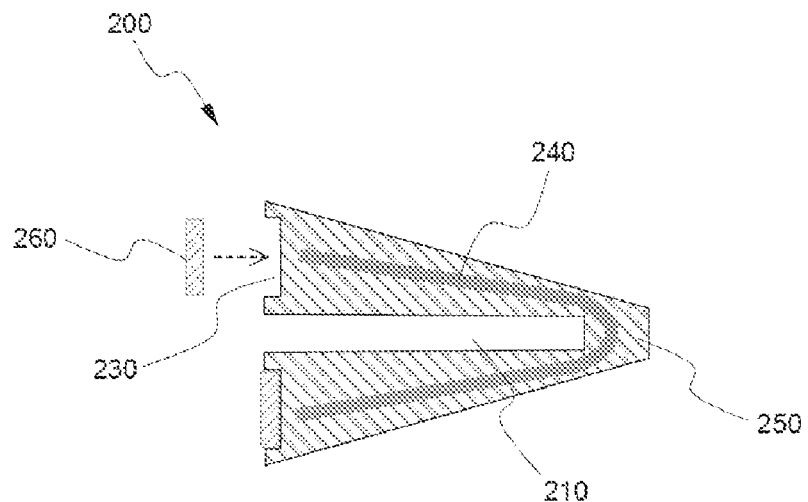

FIGS. 2 to 4 are a perspective view, a partially enlarged view, and a vertical sectional view typically illustrating a side frame member, which is coupled to each side of a battery case of a secondary battery 100 according to a preferred embodiment of the present invention, respectively.

Referring first to FIG. 2, the secondary battery 100, which is formed in the shape of a plate, is constructed in a structure in which a battery case 110, which is made of a laminated sheet, is sealed while an electrode assembly (not shown) is mounted in the battery case 110. From the upper end 120 of the battery case 110 protrudes electrode leads 170 and 180. The upper end 120 and the sides 130 of the battery case 110 are provided with sealing parts, which are formed by welding of the battery case 110. No additional sealing part is provided at the lower end 150 of the battery case 110.

Side frame members 200 and 300 have a coupling groove 210, into which the corresponding side 130 of the battery case 110, specifically, a side sealing part 132 of the battery case 110, is inserted. Also, the side frame member 200 has an upper surface 220 and a lower surface 222, which are inclined outwardly.

The detailed structure of the coupling groove 210 of the side frame member 200 will be described with reference to FIGS. 3 and 4.

The coupling groove 210 of the side frame member 200 is constructed in a structure in which the side sealing part 132 of the battery case 110 can be securely inserted into the coupling groove 210 such that the side sealing part 132 of the battery case 110 can be coupled to the coupling groove 210. At a predetermined position of the side frame member 200 opposite to a side wall 134 of the battery case 110 is formed a depression 230, in which silicon 260 is filled, whereby the sealing force of the side sealing part 132 is increased when the above-described coupling operation is carried out. Consequently, when the side sealing part 132 is securely inserted into the coupling groove 210 of the side frame member 200, the silicon 260 is attached to the side wall 134 of the battery case 110, thereby increasing the sealing force of the side sealing part 132.

Also, the side frame member 220 comprises a core part 240 having high mechanical strength and an elastic part 250 surrounding the outer surface of the core part 240. Consequently, the side sealing part 132 inserted into the coupling groove 210 is elastically coupled to the side frame member 220.

Figure 5:
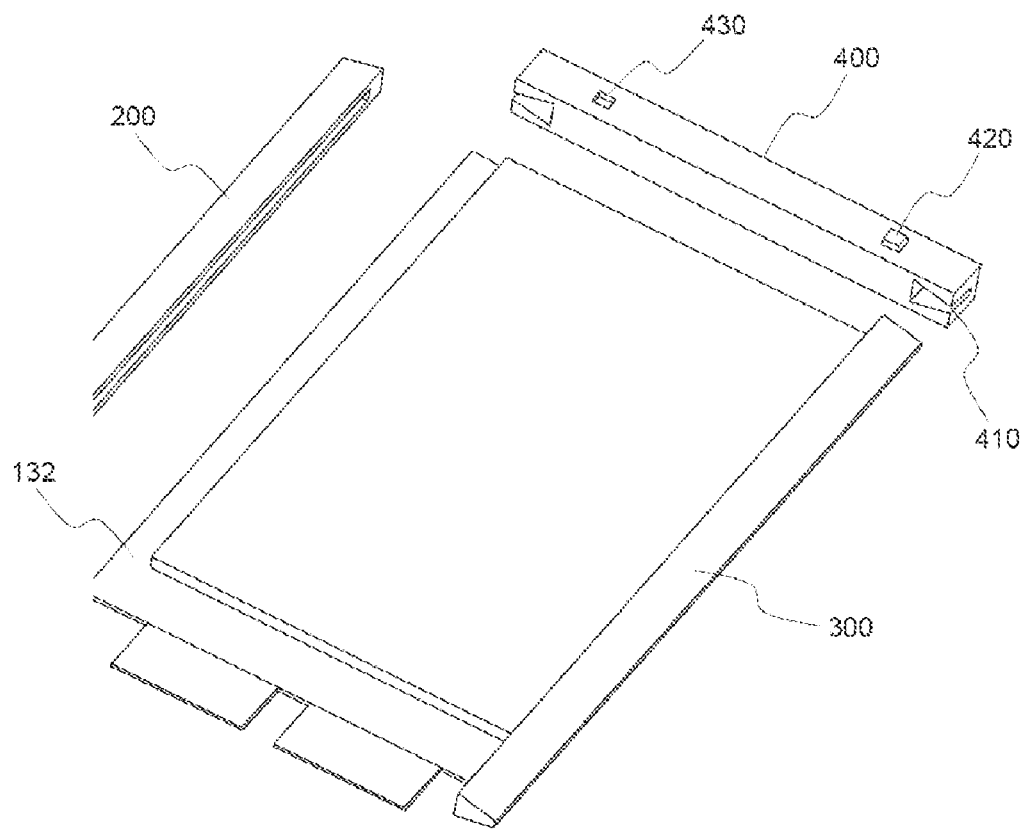
FIGS. 5 and 6 are perspective views illustrating a lower frame member of the secondary battery according to the preferred embodiment of the present invention.
Figure 6:
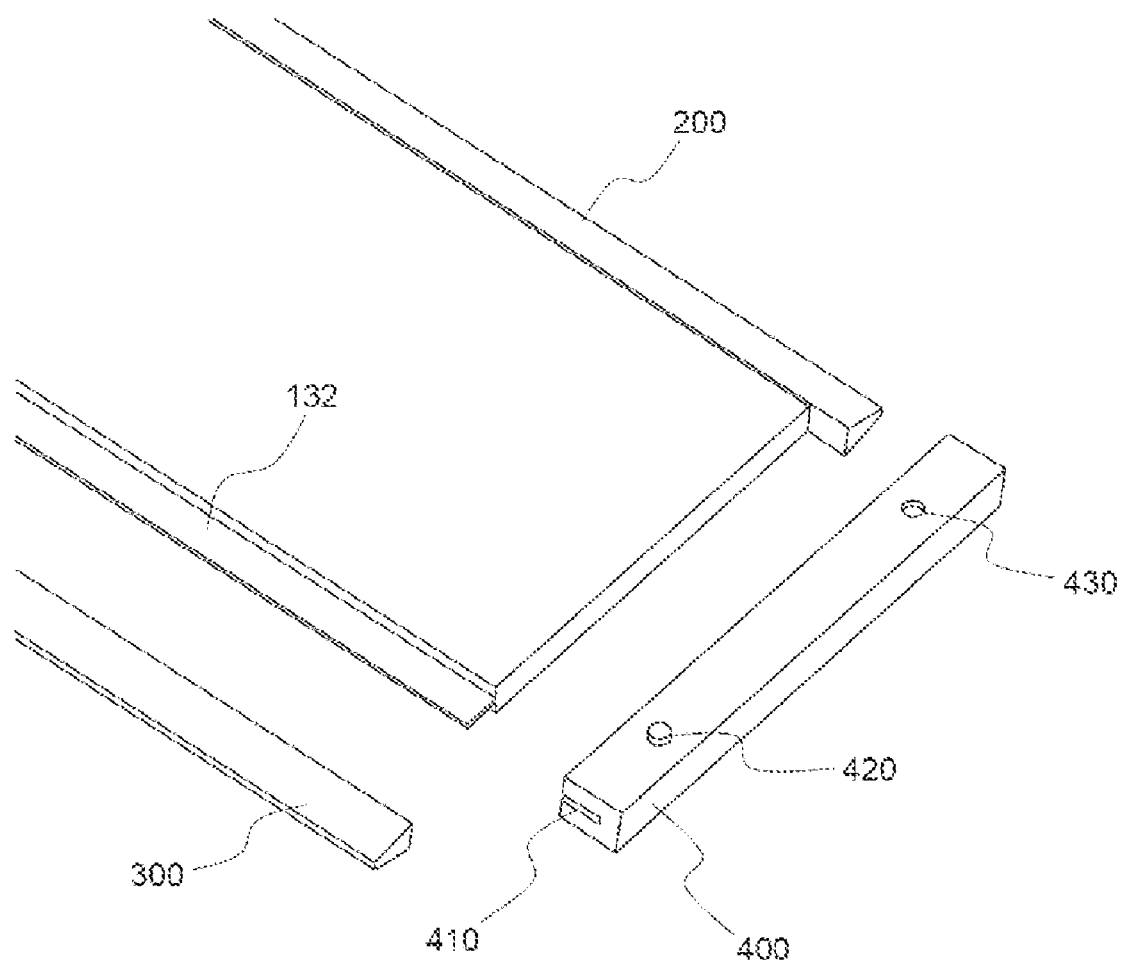

FIGS. 5 and 6 are perspective views typically illustrating a lower frame member 400 of the secondary battery according to the preferred embodiment of the present invention.

Referring to these drawings, the lower end 150 of the battery case 110 is constructed in a structure in which no additional sealing part is formed, and the lower frame member 400 is coupled to the opposite side frame members 200 and 300, whereby the lower frame member 400 is brought into contact with the lower end 150 of the battery case 110. At the corresponding regions of the lower frame member 400, which are brought into contact with the opposite side frame members 200 and 300, are formed coupling grooves 410, which correspond to the vertical sectional shape of the side frame members 200 and 300. Consequently, when the lower ends of the side frame members 200 and 300 are inserted into the coupling grooves 410 while the side frame members 200 and 300 are coupled to the side sealing part 132 of the battery case 110, the coupling of the lower frame member 400 to the side frame members 200 and 300 is accomplished.

Figure 9:
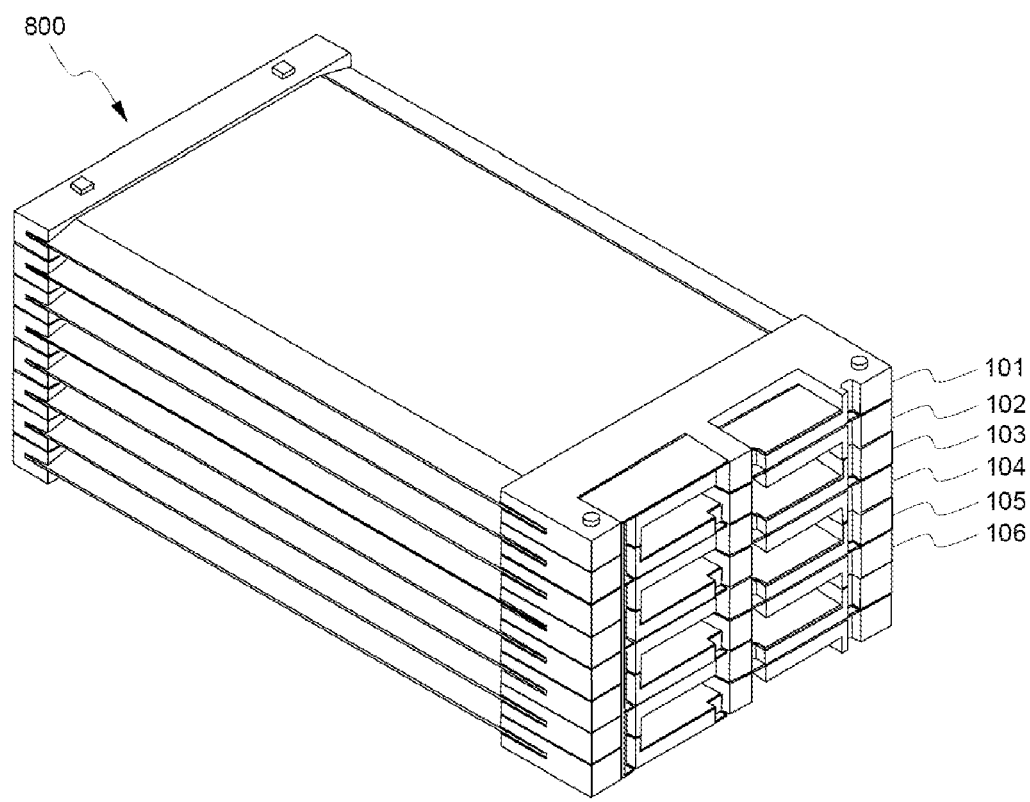
FIG. 9 is a perspective view illustrating a battery module according to a preferred embodiment of the present invention, which is manufactured using the secondary battery shown in FIG. 8.

The lower frame member 400 is provided at the upper and lower surfaces thereof with small coupling protrusions 420 and grooves 430 corresponding to the coupling protrusions 420. Consequently, when a plurality of batteries are stacked one on another, as shown in FIG. 9, the coupling protrusions 420 are engaged in the corresponding grooves 430, and therefore, the stacking operation of the batteries is stably and correctly carried out. The shape of the coupling protrusions 420 and the grooves 430 is not particularly restricted so long as the coupling protrusions 420 and the grooves 430 can perform the above-described function.

Figure 7:
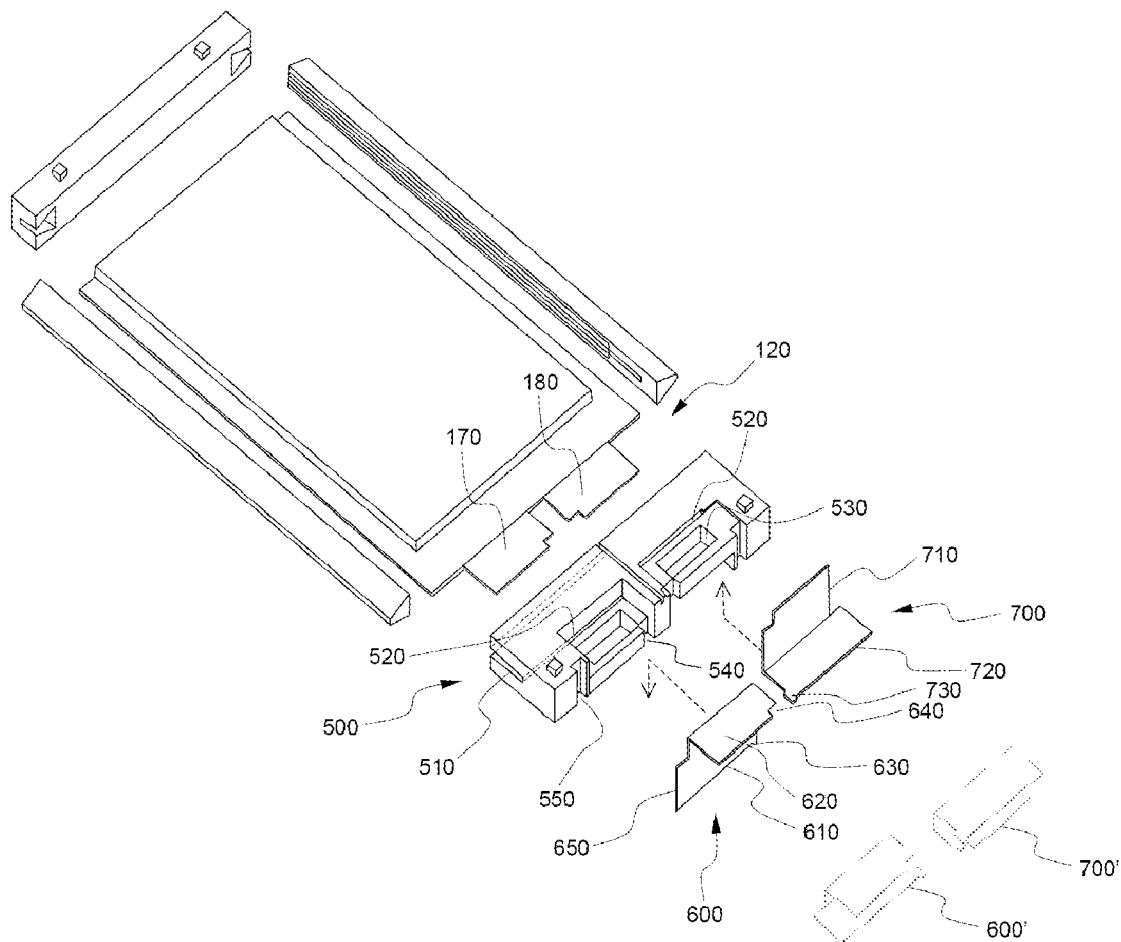
FIG. 7 is an exploded perspective view illustrating an upper frame member and bus bars of the secondary battery according to the preferred embodiment of the present invention.

FIG. 7 is an exploded perspective view typically illustrating the structure of an upper frame member 500 and bus bars 600 and 700 of the secondary battery according to the preferred embodiment of the present invention.

Referring to FIG. 7, the upper frame member 500, which is coupled to the upper end 120 of the battery case 110 where the electrode leads 170 and 180 are located, is provided along the middle part thereof with horizontal grooves 510, into which the plate-shaped electrode leads 170 and 180 are inserted. Also, the upper frame member 500 is provided at the middle part thereof with vertical grooves 520, into which the bus bars 600 and 700 are securely inserted.

On the assumption that the electrode lead 170 is a "cathode lead," for example, the bus bar 600 connected to the cathode lead 170 is vertically bent to form a vertical part 610, which is inserted into the vertical groove 520 from above the upper frame member 500, as indicated by an arrow, and a horizontal part 620 of the bus bar 600 is located on the middle part of the upper frame member 500. After that, when the cathode lead 170 is inserted through the horizontal groove 510, the cathode lead 170 is overlapped with the horizontal part 620 of the bus bar 600, and therefore, the cathode lead 170 is brought into contact with the horizontal part 620 of the bus bar 600. At this time, the connected parts may be securely fixed to each other by laser welding, whereby the electrical connection is further improved.

Also, the anode lead 180 is electrically connected to the bus bar 700 in the same principle as described above. In this case, however, the direction in which the bus bar 700 is inserted is reversed. Specifically, the bus bar 700 connected to the anode lead 180 is vertically bent to form a vertical part 710, which is inserted into the vertical groove 520 from below the upper frame member 500, as indicated by an arrow, and a horizontal part 720 of the bus bar 700 is located on the middle part of the upper frame member 500. After that, when the anode lead 180 is inserted through the horizontal groove (not shown), the anode lead 180 is overlapped with the horizontal part 720 of the bus bar 700, and therefore, the anode lead 180 is brought into contact with the horizontal part 720 of the bus bar 700. Subsequently, the connected parts of the anode lead 180 and the bus bar 700 are securely fixed to each other through openings 530 provided in the upper frame 500 by laser welding. When the battery with the above-stated construction is stacked on another battery so as to constitute a battery module as shown in FIG. 9, the vertical parts 610 and 710 of the bus bars 600 and 700 mounted to the upper frame member 500 are bent in the same shape as bus bars 600' and 700' shown by thin solid lines in FIG. 7.

This reverse-structure coupling method allows a plurality of batteries to be electrically connected with each other with ease and convenience when the batteries are stacked one on another so as to construct a series-connection type battery module as shown in FIG. 9.

The bus bar 600 is provided at one side thereof with a voltage-detection and connection protrusion 630 for performing the electrical connection between the batteries and, at the same time, detecting the voltage of the corresponding battery. Consequently, the upper frame member 500 is provided at the side thereof with a first side groove 540 such that the voltage-detection and connection protrusion 630 is exposed through the first side groove 540 while the bus bar 600 is mounted to the upper frame member 500. Also, the end 640 of the electrode lead, which is exposed from the first side groove 540, has a cut-off structure, by which the voltage-detection and connection protrusions 630 and 730 can be easily connected to a predetermined circuit through the first side groove 540 while the bus bars 600 and 700 are bent in the same shape as the bus bars 600' and 700'. This structure is equally applied to the bus bar 700.

Also, the bus bar 600 is provided at one side thereof with a side extension 650, by which the resistance welding of the bus bar 600, which is in contact with another bus bar, is easily performed when the batteries are stacked one on another so as to construct the battery module as shown in FIG. 9. At the outer surface of the upper frame member 500 corresponding to the side extension 650 is formed a second side groove 550, to which a welding tip (not shown) can make an approach. This structure is equally applied to the bus bar 700.

Figure 8:
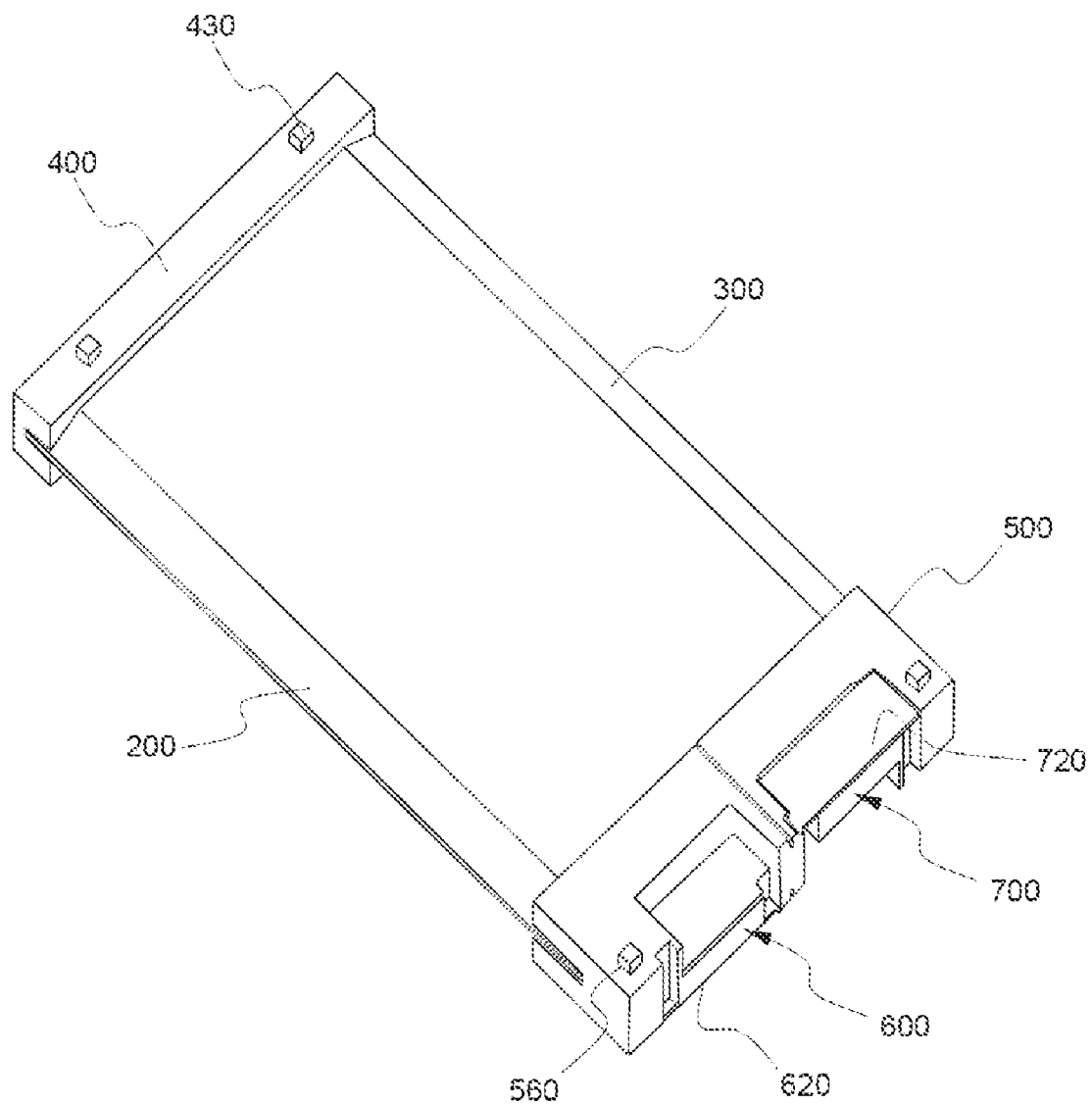
FIG. 8 is a perspective view of the secondary battery according to the preferred embodiment of the present invention in the state that the bus bars are mounted to the upper frame member shown in FIG. 7, and the respective frame members are coupled to the outside parts of the battery case, respectively.

FIG. 8 is a perspective view of the secondary battery according to the preferred embodiment of the present invention in the state that the bus bars are mounted to the upper frame member shown in FIG. 7, and the respective frame members are coupled to the outside parts of the battery case, respectively. The bus bars 600 and 700 are finally bent when the batteries are stacked one on another as shown in FIG. 9. For easy understanding, however, the bus bars 600 and 700 are shown bent in FIG. 8.

As shown in FIG. 8, high mechanical strength is accomplished by the provision of the respective frame members 200, 300, 400, and 500, and the sealing regions of the battery case have further increased sealing force. Also, the electrode leads are electrically connected to the bus bars 600 and 700 without the electrode leads being bent.

For example, the bus bar 600 connected to the cathode lead is mounted such that the horizontal part 620 of the bus bar 600 is exposed to the lower surface of the upper frame member 500, and the bus bar 700 connected to the anode lead is mounted such that the horizontal part 720 of the bus bar 700 is exposed to the upper surface of the upper frame member 500. In other words, the bus bars 600 and 700 are mounted in the opposite directions such that the bus bars 600 and 700 are exposed to the lower and upper surfaces of the upper frame member 500. Consequently, when the battery module is constructed as shown in FIG. 9, the electrical connection between the bus bars is easily accomplished.

The side frame members 200 and 300 have a smaller height than that of the upper and lower frame members 400 and 500. Furthermore, the outer surfaces of the side frame members 200 and 300 are inclined. Consequently, the side frame members 200 and 300 provide a coolant flow channel when the batteries are stacked one on another as shown in FIG. 9.

At the upper surfaces of the upper and lower frame members 400 and 500 are formed coupling protrusions 430 and 560. At the lower surfaces of the upper and lower frame members 400 and 500 are formed coupling grooves (not shown) corresponding to the coupling protrusions 430 and 560. Consequently, the coupling of the batteries is stably accomplished at predetermined positions when the batteries are stacked one on another as shown in FIG. 9.

FIG. 9 is a perspective view typically illustrating a battery module 800 according to a preferred embodiment of the present invention, which is manufactured using the secondary battery shown in FIG. 8.

Referring to FIG. 9, the battery module 800 is constructed by successively stacking a plurality of unit cells 101, 102, 103 . . . one on another. During the stacking of the unit cells, the odd-numbered unit cells 101, 103, 105 . . . are stacked in the same orientation, and the even-numbered unit cells 102, 104, 106 . . . , which are interposed between the respective odd-numbered unit cells 101, 103, 105 . . . , are stacked in the orientation opposite to the orientation of the odd-numbered unit cells 101, 103, 105 . . . . Easy electrical connection between the bus bars is accomplished by the provision of the above-described alternating-orientation stacking structure.

As described above, the secondary battery and the battery module can be constructed in various structures according to the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the secondary battery according to the present invention has independent frame members, which are coupled to the outsides of the sheathing member. Consequently, the secondary battery has a high mechanical strength and a large sealing force. Furthermore, the electrical connection is accomplished without bending the electrode leads. Also, the battery module, which is constructed with the secondary battery as a unit cell, can be manufactured with a compact structure and a relatively light weight. Furthermore, the assembly process of the battery module is greatly simplified. The structural stability of the battery module according to the present invention is very high, and therefore, the battery module can be preferably used as a power source for electric vehicles, hybrid electric vehicles, electric motor cycles, and electric bicycles.

What is claimed is:

1. A secondary battery a shape of a plate, the secondary battery comprising:
   a battery case made of a laminated sheet including a metal layer and a resin layer and including a sheathing member;
   electrode leads disposed at an upper end of the sheathing member; and
   independent coupling frame members, including an upper frame member, a lower frame member and a side frame member, wherein the upper frame member is mounted to an upper end portion of the sheathing member, the lower frame is mounted to a lower end portion of the sheathing member and the side frame member is mounted to a side end portion of the sheathing member,
   wherein the upper frame member includes a horizontal groove formed at a side surface thereof and vertical grooves formed in a middle portion thereof and connected to the horizontal grooves,
   the electrode leads are inserted into the upper frame member through the horizontal groove of the upper frame member, and
   the electrode leads inserted through the horizontal groove are connected to bus bars when the bus bars are inserted into the vertical grooves of the upper frame member.

2. The secondary battery according to claim 1, wherein
   the side frame includes a groove,
   each of the upper end portion and the side end portion of the sheathing member includes a thin plate-shaped sealing portion,
   the thin plate-shaped sealing portion of the upper end portion of the sheathing member is inserted into the horizontal groove of the upper frame member, and
   the thin plate-shaped sealing portion of the upper end portion of the sheathing member is inserted into the groove of the side frame member.

3. The secondary battery according to claim 1, wherein the upper and lower frame members have the same height, and the height of the upper and lower frame members is greater than the height of the side frame member.

4. The secondary battery according to claim 3, wherein the side frame member is tapered outward at the upper surfaces and/or the lower surfaces thereof.

5. The secondary battery according to claim 2, wherein at least a portion of the upper frame member in contact with the thin plate-shaped sealing portion of the upper end portion of the sheathing member and at least a portion of the side frame member in contact with the thin plate-shaped sealing portion of the side end portion of the side end portion of the sheathing member include an elastic material.

6. The secondary battery according to claim 1, wherein the side frame member comprises:
   a core part which is mechanically rigid; and
   an elastic part surrounding an outer surface of the core part.

7. The secondary battery according to claim 1, wherein
   the side frame member include a depression formed at a portion thereof in contact with the thin plate-shaped sealing portion of the side end portion of the side end portion of the sheathing member, and
   an auxiliary sealing agent is filled in the depression to accomplish secure coupling between the frame members and the battery case when the frame members are coupled to the battery case.

8. The secondary battery according to claim 7, wherein the auxiliary sealing agent is silicon.

9. The secondary battery according to claim 1, wherein at least one of the upper frame member and the lower frame member includes a coupling groove formed at a portion thereof contacting with the side frame member and having a shape corresponding to a vertical cross-sectional shape of the side frame member.

10. The secondary battery according to claim 1, wherein an upper surface and a lower surface of at least one of the upper frame member and the lower frame member are provided with engageably corresponding coupling protrusions and grooves.

11. The secondary battery according to claim 1, wherein
    the bus bars are bent into an L-like shape such that vertical portions of the bus bars are inserted into the vertical grooves of the upper frame member, and horizontal portions of the bus bars are in contact with the electrode leads.

12. The secondary battery according to claim 1, wherein the upper frame member include openings, through which contacting portions of the electrode leads and the bus bars are exposed for a welding between the electrode leads and the bus bars.

13. The secondary battery according to claim 1, wherein
    the bus bars, which are connected to the electrode leads, are inserted into the vertical grooves of the upper frame member in opposite directions, such that
    one bus bar of the bus bars is exposed from the upper surface of the upper frame member and
    another bus bar of the bus bars is exposed from the lower surface of the upper frame member.

14. The secondary battery according to claim 1, wherein
    each of the bus bars is provided at one side thereof with a voltage-detection and connection protrusion,
    the upper frame member is provided at the side thereof with a side groove such that the voltage-detection and connection protrusion is exposed through the side groove while the each of the bus bars is mounted to the upper frame member, and
    an end of the electrode leads, which is exposed from the side groove, is cut off.

15. The secondary battery according to claim 1 wherein
    each of the bus bars is provided at one side thereof with a side extension for resistance welding of the bus bars, and
    the upper frame member includes another side groove formed at the outer surface thereof corresponding to the side extension for welding.

16. A battery module including the secondary battery according to claim 1 as a unit cell,
    wherein a plurality of odd-numbered unit cells and a plurality of even-numbered unit cells are alternately stacked, and
    wherein the plurality of odd-numbered unit cells is stacked in a same orientation and the plurality of even-numbered unit cells is stacked in an orientation opposite to the orientation of the odd-numbered unit cells.

17. The battery module according to claim 16, wherein the battery module supplies electric power to electric vehicles, hybrid electric vehicles, electric motor cycles, or electric bicycles.

* * * * *